July 6, 1937.　　　R. J. BURROWS ET AL　　　2,085,897
DRIVE FOR RAIL CARS
Filed April 10, 1933　　　4 Sheets-Sheet 1

Inventors.
Robert J. Burrows
Alfred O. Williams
By Brown, Jackson, Boettcher + Dienner
Attys.

July 6, 1937.   R. J. BURROWS ET AL   2,085,897
DRIVE FOR RAIL CARS
Filed April 10, 1933   4 Sheets-Sheet 3
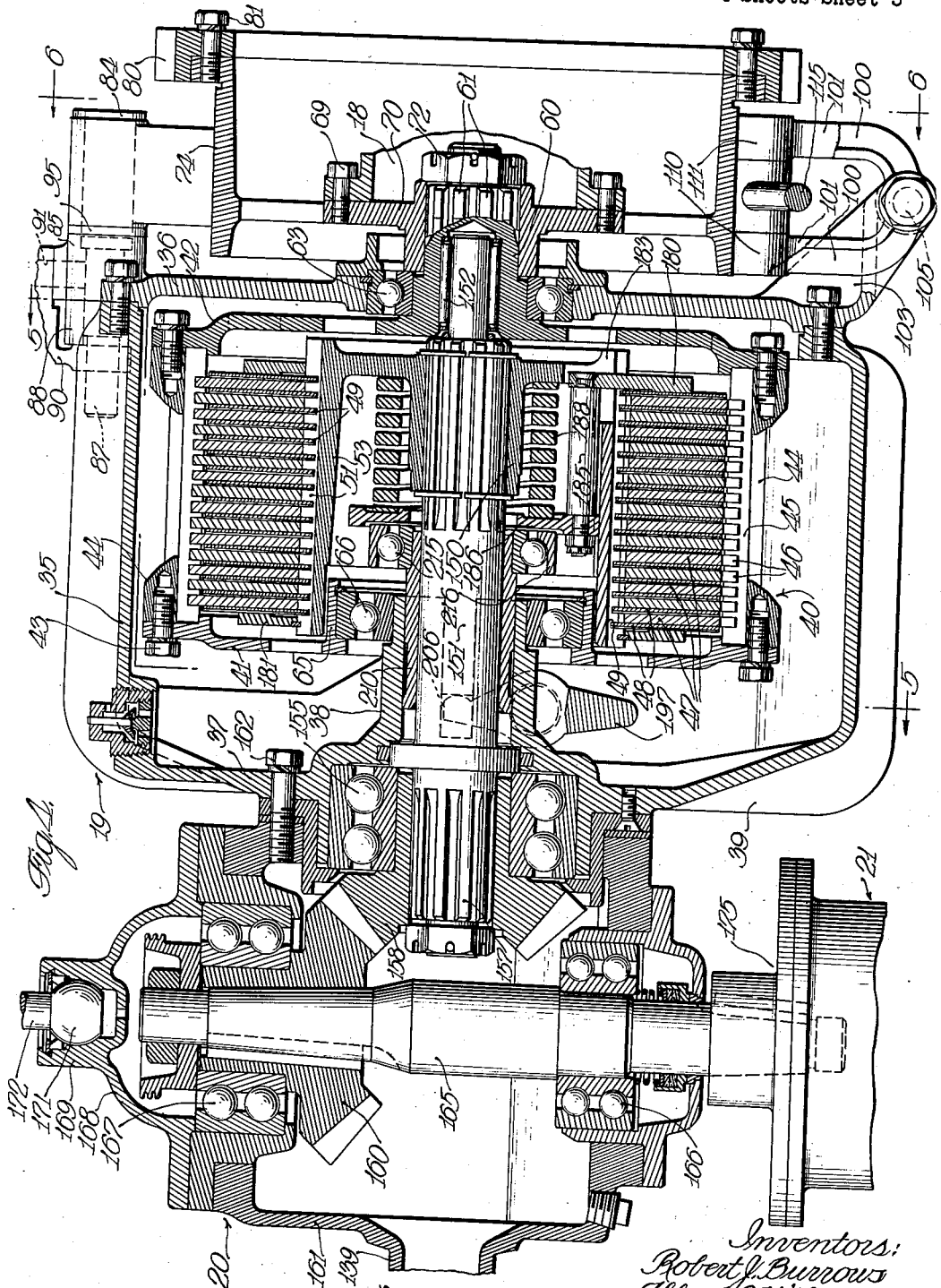

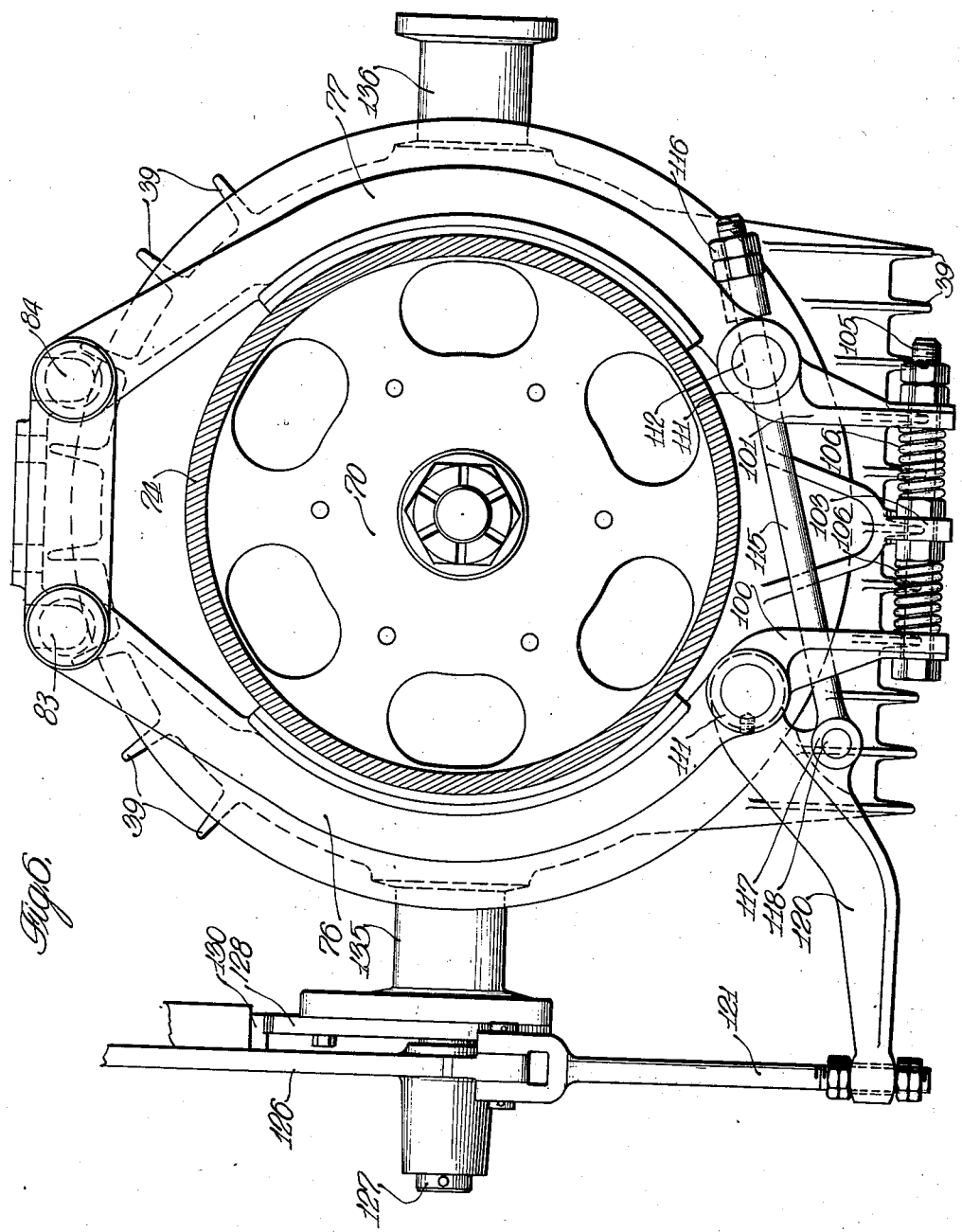

Patented July 6, 1937

2,085,897

UNITED STATES PATENT OFFICE 2,085,897

DRIVE FOR RAIL CARS

Robert J. Burrows and Alfred O. Williams, Battle Creek, Mich., assignors, by mesne assignments, to Clark Equipment Company, Buchanan, Mich., a corporation of Michigan Application April 10, 1933, Serial No. 665,298

11 Claims. (Cl. 192—48)

The present invention relates generally to automotive vehicles and the like, particularly vehicles such as motor driven rail cars and the like, and the principal object of the present invention is the provision of improved drive means for driving such cars.

Relatively light weight rail cars have been designed for railroad equipment, particularly for high speed passenger service, and generally such rail cars are powered by gasoline motors or some similar source of power. Gasoline motors, as is well known, develop little torque at low speeds, and while such rail cars of the type just referred to are of relatively light weight, such vehicles are nevertheless heavy enough to present some difficulties in the way of smooth and easy starting.

The principal object, therefore, of the present invention is the provision of new and improved driving means for such rail cars wherein provision is made for smooth and easy starting when employing such sources of power as gasoline motors and other internal combustion engines and the like. Briefly, the present invention contemplates the provision of auxiliary clutch means of the heavy duty type which provides for a considerable amount of slipping when first starting the car or when accelerating the same. In rail cars powered by gasoline motors or other types of internal combustion engines, it has been found that the conventional automotive type of clutch is not adapted for use in starting the cars, due principally to the fact that such clutches would not withstand the slippage necessary to get the car under way smoothly and without jerking. Such difficulties have been overcome, according to the principles of the present invention, by the provision of an auxiliary clutch particularly adapted to withstand the slippage necessarily present where a relatively heavy rail car is started from a standing position and where the gasoline motor must be operated at considerable speed in order to develop the required torque.

Another object of the present invention is the provision of an auxiliary clutch of the heavy duty type and wherein the control means therefor is arranged to be automatically operated by the operation of the conventional clutch, the operation of the conventional clutch being preferably accomplished in the ordinary manner.

Another object of the present invention is the provision of driving means for rail cars and the like wherein two serially connected clutches are employed, one clutch being adapted to quickly connect and disconnect the source of power from the driving truck, while the other clutch, which may or may not be connected to be controlled with the first clutch, is adapted to engage somewhat more slowly than the first clutch in order to provide for smooth and easy starting.

Automotive clutches in use today include means arranged for the actuation thereof from intake suction, and the present invention also contemplates the provision of suction operated means for controlling the auxiliary or slippage clutch by the same or similar means, thus providing a construction in which the control for the second or auxiliary clutch is entirely automatic and which does not, in any way, make the operation of the first clutch, which may be a conventional clutch, any different. Being entirely automatic, the provision of the secondary heavy duty clutch does not require the employment of especially trained operators.

These and other objects and advantages of the present invention will be apparent from the following description of an illustrative construction, taken in conjunction with the accompanying drawings illustrating such construction.

In the drawings:

Figure 4 is an enlarged vertical section taken through the auxiliary or slippage clutch and associated bevel gear set;

Figure 6 is a section taken along the line 6—6 of Figure 4.

Figure 1:
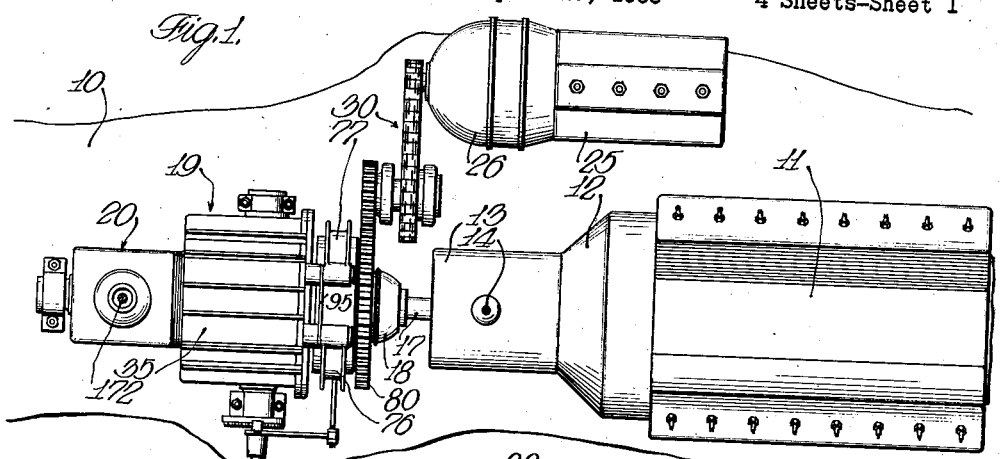
Figure 1 is a top plan view, somewhat diagrammatic, illustrating the power plant and associated transmission means of a rail car or similar vehicle.

Referring now to the drawings, the reference numeral 10 indicates the frame or body of the rail car or similar vehicle which is powered by a main power plant 11 comprising, in the illustrated construction, a sixteen cylinder internal combustion engine including a conventional clutch 12 enclosed within a clutch housing forming a part of the power plant 11. As is usual, a transmission housing 13 is operatively connected with the clutch housing 12 and contains the usual change gears controlled by a gear shift lever 14.

The driven shaft of the transmission 13 is indicated by the reference numeral 17, and at the rear end of this shaft a universal joint 18 is provided, as in the usual arrangement.

According to the principles of the present invention, the drive from the shaft 17 and the universal joint 18 is transmitted to an auxiliary or slippage clutch of the heavy duty type indicated, in its entirety, by the reference numeral 19, and from the slippage clutch the drive is transmitted through a bevel gear set, indicated in its entirety by the reference numeral 20, to a vertically disposed drive shaft means 21. The drive shaft means 21 is adapted to be operatively connected with the driving truck of the rail car 10, as more clearly set forth in our copending application for a Rail car, Serial No. 610,079, filed May 9, 1932.

In addition to the main power plant 11 the rail car 10 is also preferably provided with an auxiliary motor 25, which may also be an internal combustion engine, and this motor may be arranged for various service functions on the car, such as providing driving means for air pumps, lighting systems and the like, and in Figure 1 we have shown a direct connected generator 26 as representative of such driven means associated with the auxiliary power plant 25. Moreover, according to the principles of the present invention, the auxiliary motor 25 is also arranged so that it can be used to drive the rail car 10 in place of the main power plant 11 should it be desired to do so, as for example if the main power plant 11 should become disabled. The optionally disposable connections between the auxiliary power plant 25 and the driving means for the rail car are indicated, as a whole, by the reference numeral 30 in Figure 1.

Figure 5:
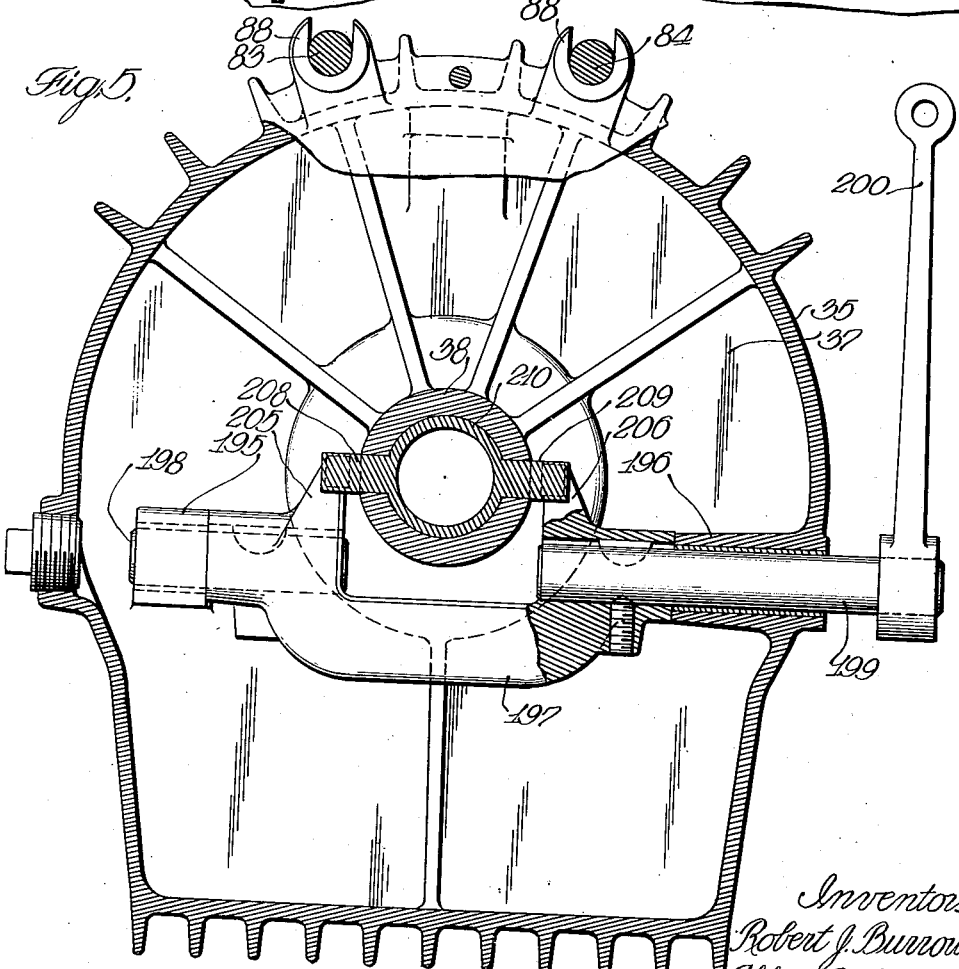
Figure 5 is a section taken along the line 5—5 of Figure 4.

The heavy duty slippage clutch, which is serially connected with respect to the conventional motor clutch 12, is best shown in Figures 4, 5, and 6. Referring more particularly to Figure 4, the housing for the slippage clutch is indicated by the reference numeral 35, and this housing is provided at its forward end with a closure plate 36 forming the front wall of the housing, the rear wall 37 being preferably formed integral with the housing and provided with a central inwardly directed hub 38. Exterior fins 39 on the casing 35 provide for proper cooling of the slippage clutch.

The driving member of the clutch takes the form of a cage 40 which includes a pair of side rings 41 and 42 secured by cap screws 43 to a cylindrical member 44 provided with a plurality of longitudinally disposed slots or notches 45 to receive the peripherally outer teeth 46 of the driving clutch elements 47. These elements, which are more or less conventional in construction, preferably take the form of metallic discs between which are disposed the discs 48 forming the driven clutch elements. The discs 48 have peripherally inner teeth 49 which engage in grooves or notches 51 formed in the peripherally outer surface of a clutch drum 53 disposed between and arranged for rotation coaxially of the side rings 41 and 42 of the cage 40.

The forward clutch ring 42 carries a central hub 60 which is provided with splines 61 and a shoulder on which is disposed suitable anti-friction bearing means 63 by which the forward end of the slippage clutch is journaled on the forward wall 36 of the housing 35. The rear clutch ring 41 is provided with an inwardly directed flange 65 which receives suitable anti-friction bearing means 66 supported on the inwardly directed bearing hub 38 carried by the rear wall 37 of the housing 35. Thus, the cage 40, which forms the driving member of the slippage clutch, is journaled for rotation within the casing 35. The drive from the motor 11 and its clutch 12 and transmission 13, is transmitted to the driving member 40 of the slippage clutch by means of the universal joint 18, mentioned above, which is connected with the hub 60. The universal joint 18 includes a member secured, as by cap screws 69, with a plate member or web 70 nonrotatably mounted on the splined hub 60 and secured thereon by suitable lock nut means 72. The web or plate 70 is extended radially outwardly, as best shown in Figure 4, and is formed with a brake drum 74 with which brake shoes 76 and 77 cooperate, as indicated in Figure 6. The brake drum 74 also carries a ring gear 80 secured to the flange of the brake drum by suitable cap screws 81 or the equivalent. The driving connections 30 from the auxiliary motor 25 are preferably connected with the ring gear 80, as shown in Figure 1.

The brake shoes 76 and 77 are anchored to studs 83 and 84 mounted in a boss or bosses 85 carried by the forward plate 36. The pivot studs 83 and 84 have ends 87, as best shown in Figure 4, and these ends pass through slotted portions 88 of the casing. The bosses 85 are also slotted, to facilitate removal of the brake shoes 76 and 77. The pins 83 and 84 are held in place by members 90 passed over the ends 87 and secured to the front wall 36 by cap screws 91. The pivot pins or studs 83 and 84 are reenforced against lateral displacement by a connecting plate 95 shown in Figure 4.

The means for applying the brakes will now be described. The brake shoes 76 and 77 carry arm portions 100 and 101 which are disposed, respectively, on opposite sides of a forwardly and downwardly extending lug 103. This lug is apertured to receive a guiding pin 105, as also are the arms 100 and 101, and between each of the arms and the lug 103 is a spring 106, these springs serving to move the brake shoes 76 and 77 away from the brake drum 74.

Figure 2:
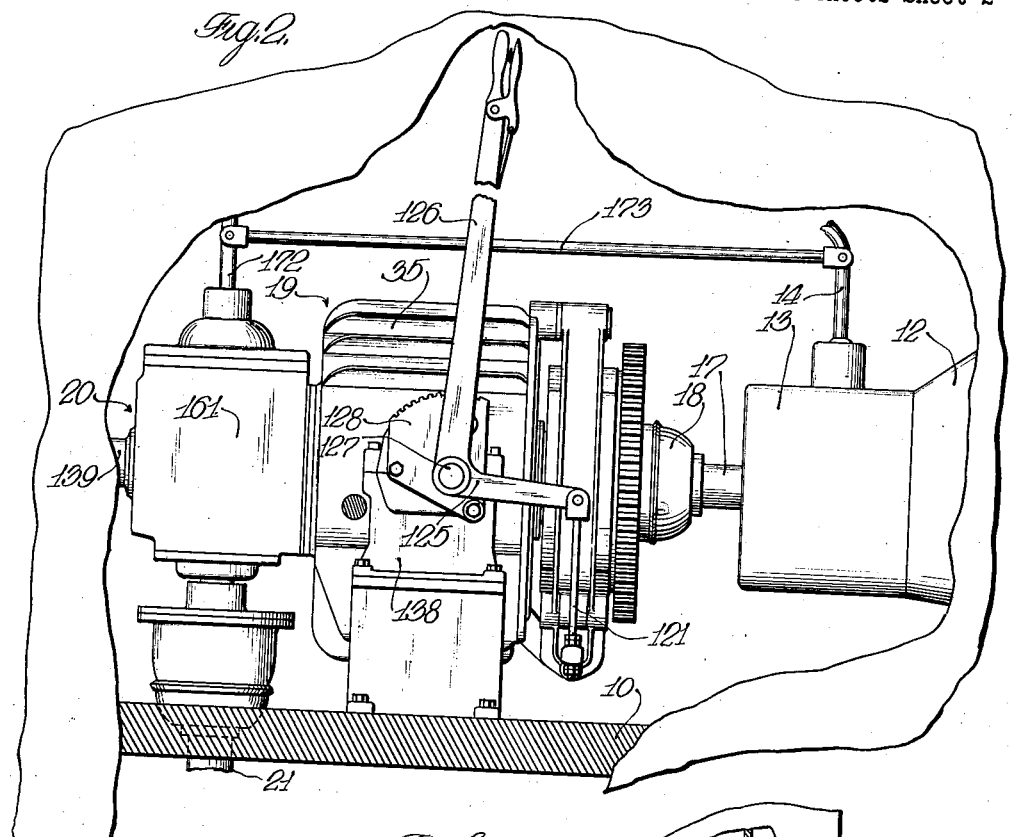
Figure 2 is a side elevation on an enlarged scale of our improved auxiliary or slippage clutch and associated parts.

As best shown in Figures 4 and 6, the arm 101 includes spaced portions provided with apertured bosses 110 and 111 and receiving a swivel pin 112. The swivel pin 112 is apertured to receive a tension link 115. One end of this link is adjustably connected, as by lock nuts 116 with the swivel pin while the other end of the link 115 is provided with an eye 117 which is pivotally connected, as by a pivot pin 118, with a brake arm 120 pivotally mounted in the bosses 110 and 111 of the brake shoe arm 100. The outer end of the brake arm 120 is pivotally connected with a link 121 which, in turn, is connected with the arm 125 of a hand lever 126, as best shown in Figure 2. The brake lever 126 is mounted on a stud 127 projecting from a sector plate 128, and the lever 126 carries ratchet mechanism 130 cooperating with the sector 128 to maintain the brake in desired position.

The brake lever 126 and its sector 128 may be supported in any manner desired. Preferably, however, the brake lever 126 is supported from an arm 135 which extends from one side of the casing 35 diametrically opposite a similar arm 136 extending from the other side of the casing. These arms are suitably mounted, preferably by rubber cushioning means, on supports 138 carried by the rail car 10, as best shown in Figure 2. The rear end of the casing 35 is, as mentioned above, supported from the bevel gear set 20, and the rear portion of the casing of the bevel gear set is provided with a similar arm 139 which may be supported in a manner similar to that described above for the supporting arms 135 and 136.

Referring again to Figure 4, the driven member 53 of the slippage clutch includes a hub 150 splined onto a driven shaft 151 which is piloted, as by bearing means 152, in a socket formed in the hub 60 of the forward driving clutch ring 42. The rear end of the driven shaft 151 is supported by suitable bearing means 155 in the rear wall 37 of the casing 35, and this end of the shaft 151 is splined, as at 157, to receive a bevel gear 158. This gear meshes with a companion bevel gear 160, and both gears are disposed within the housing 161 of the bevel gear set 20. The housing 161 is connected by any suitable means, as by cap screws 162, with the rear wall 37 of the slippage clutch casing 35 so that, in effect, these casings act as a rigid unit. A vertically disposed shaft section 165 is disposed within the casing 161, being journaled therein by suitable bearing means 166 and 167. The upper bearing means 167 is enclosed by a plate 168, and this member is formed with a socket 169 to receive the lower or ball end 171 of a manually controlled gear shift lever 172 connected by any suitable means 173 with the shift lever 14.

The lower end of the vertical shaft section 165 is connected in any suitable manner with a universal joint 175 which is connected with or forms a part of the telescopic vertical drive shaft means 21 referred to above.

The clutch plates 47 and 48 are adapted to be pressed together in frictional engagement by means of a pressure plate 180 disposed near the forward end of the cage 40 and movably mounted on the forward end of the drum 53. At the rear end of the drum 53 is a reaction plate 181 keyed or otherwise fixed against axial movement on the drum 53. The pressure ring 180 has inwardly directed portions disposed in slots 183 formed in the drum 53, and these portions are rigidly connected by spacing members 185 with a ring 186 disposed within the drum 53 and in operative association with a clutch spring 188 biased between the ring 186 and the hub flange of the drum 53. The effect of the spring 188 is, as is obvious, to press the pressure ring 180 against the clutch discs 47 and 48 to thereby establish driving connection between the driving clutch cage 40 and the drum 53.

The clutch may be disengaged by compressing the spring 188, thus relieving the pressure plate 180 of the pressure thereon. For this purpose the casing 35 is provided with a pair of journal bosses 195 and 196, best shown in Figure 5, in which is journaled a clutch throw-out yoke 197, the latter being provided with short shaft sections 198 and 199 for this purpose. The shaft section 199 extends outwardly of the casing 35 and has secured to it a clutch operating arm 200. The throw-out yoke 197 includes a pair of lugs 205 and 206, see Figures 4 and 5, which are adapted to cooperate with lateral extensions 208 and 209 formed on a sleeve 210 slidably mounted on the rear portion of the driven shaft 151 and provided with thrust bearing means 215 which includes an outer race 216 adapted to bear against the ring member 186. Normally, that is, when the clutch is engaged, the parts are disposed as illustrated in Figure 4, in which case the outer race 216 of the thrust bearing clears the ring 186 so that there is no relative rotation at this point during the operation of the clutch. To accommodate the extensions 208 and 209 the journal hub section 38 of the rear wall of the housing is slotted, as best shown in Figure 5.

Figure 3:
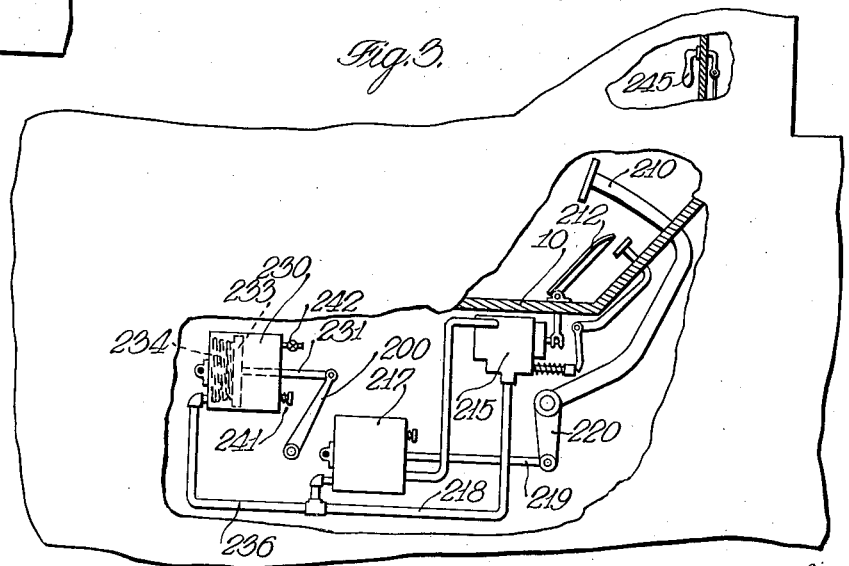
Figure 3 is a similar side elevation, showing the control mechanism for both the conventional clutch embodied in the main power plant and the auxiliary or slippage clutch.

Reference has been made above to the fact that the slipping clutch 19 is simultaneously and automatically controlled in conjoint operation with the conventional motor clutch 12. Referring now more particularly to Figure 3 the conventional operator-controlled clutch pedal for actuating the conventional clutch 12 is indicated by the reference numeral 210. This pedal is connected by any suitable linkage (not shown) with the clutch 12. Preferably, the clutch 12 is provided with automatic vacuum operated control means by which the clutch 12 may be engaged and disengaged according to certain positions of the accelerator pedal 212 which serves as a throttle for controlling the speed of the motor 11. Automatic vacuum control means for automatic clutches and the like is well known in the art and no claim is here made to such mechanism per se. Generally, a vacuum line is extended from the intake manifold of the motor 11 to a control valve mechanism, indicated in its entirety by the reference numeral 215 in Figure 3, and this control valve is associated with the accelerator pedal in such a manner that in certain positions of the accelerator pedal 212, suction, controlled by the valve means 215, is applied to one end of a power cylinder 217 through a suction line 218 to retract a piston 219 which is connected with an arm 220 forming a part of or associated with the clutch pedal 210. Thus, as is well understood, under certain conditions the intake suction of the motor 11 is made operative to automatically disengage the conventional motor clutch 12. In other positions of the accelerator pedal 212 the piston 219 returns the clutch 12 by spring pressure or other means to engaged position, this return being under the control of the valve means 215 so that the engagement of the clutch 12 is accomplished at the desired rate.

Generally such automatic vacuum operated control mechanism is arranged so that, with the motor 11 operating at a fair rate of speed or better, if the accelerator pedal is released, the vacuum in the intake manifold of the motor will be caused to automatically and immediately release or disengage the motor clutch 12. As soon, however, as the accelerator pedal is depressed to feed fuel to the motor, the intake suction is cut off from the power cylinder 217 and the latter is vented to the atmosphere so that the clutch 12 automatically engages to transmit the drive from the motor to the driving wheels of the car. Such arrangement is generally known as controlled free wheeling, and while this particular operation is not necessarily essential to the present invention, we propose to utilize such clutch control means in automatically controlling the operation of our serially connected auxiliary or heavy duty clutch 19. For this purpose we dispose a second power cylinder 230 in such position that the piston 231 thereof is operatively connected, either directly or indirectly, with the clutch arm 200, as shown somewhat diagrammatically in Figure 3. The power cylinder 230 contains a conventional piston head 233 biased toward movement in one direction by a spring or the equivalent 234. This spring may be disposed within the cylinder 230 or it may be mounted exteriorly thereof in any desired position on the car 10.

The suction side of the power cylinder 230 is connected by means of a line 236 with the suction side of the conventional power cylinder 217, as by being connected with the suction line 218 therefor. Preferably, the connections are so established that whenever suction is established in the power cylinder 217 it is also established in the power cylinder 230. Both clutches are therefore disengaged at substantially the same moment.

With respect to reengagement of the clutches 12 and 19, reference was made above to the fact that the reengagement of the conventional clutch 12 is controlled by the return of the piston 219, and the piston 219 is controlled by the valve mechanism 215. In ordinary automotive practice, the return of the piston 219, and hence the reengagement of the conventional clutch 12, is fairly rapid so that, while shocks are avoided, the clutch 12 is arranged to have only limited slipping for a short length of time.

In order to relieve the conventional and more or less quick acting clutch 12 from the slippage necessary to get the relatively heavy rail car under way from a standing start or the like, the power cylinder 230 for the slippage clutch 19 is arranged to engage more slowly than the clutch 12. This provides, therefore, for an amount of slippage which is necessary to start or accelerate the car while permitting the motor 11 to maintain sufficient speed to develop the required power. Preferably, the clutch 19 is arranged to be engaged at a fixed rate which need not be varied once it has been determined for the particular car on which it is mounted. According to the principles of the present invention, the power cylinder 230 opposite its suction end with which the suction line 236 cooperates is provided with a quick opening check valve 241 and an adjustable bleeder valve 242. The check valve 241 is provided to accommodate the rapid movement of the piston 233 to quickly disengage the clutch 19 but is adapted to close when the suction is released, the return of the piston 233 being under the action of a spring 234 controlled according to the rate at which air escapes from the cylinder 230 through the bleeder valve 242. Since this valve can be adjusted, the rate of reengagement of the slippage clutch 19 can be accurately controlled.

In case it is desirable to provide some form of control means for throwing into and out of operation the automatic vacuum operated control described above, the rail car 10 may be provided with a manual control lever 245 or the equivalent by which, for example the suction between the motor 11 and the control valve 215 may be entirely shut off. In this case both power cylinders 217 and 230 will remain inoperative and the motor clutch 12 will be under the sole control of the clutch pedal 210 while the slippage clutch 19 will remain engaged at all times. However, if it is desirable under such conditions to utilize the slippage clutch, the clutch arm 200 may be operated by any form of manual means (not shown), in which case the reengagement of the slippage clutch will be controlled, as before, by the control valve 242. However, this feature may be dispensed with if desired.

As has been mentioned above, the drive for the rail car is transmitted from the slippage clutch 19 to the bevel gear set 20 and from thence through the vertically disposed drive shaft means 21 to the driving truck or driving wheels of the rail car.

While we have described above the preferred construction in which we have illustrated the principles of our invention, it is to be understood that our invention is not to be limited to the means shown and described, but that, in fact, widely different means may be employed in the practice of the broader aspects of our invention. For example, the transmission 13 may be in the form of hydraulic mechanism arranged to provide the proper starting and driving ratios for the rail car.

What we claim, therefore, and desire to secure by Letters Patent is:

1. In a rail car, a motor having a manually controlled clutch, a gear change transmission driven thereby, a separate heavy duty clutch connected to be driven from said transmission and adapted for limited slippage during starting of the car, means for simultaneously disengaging both clutches, and means providing for reengagement of said slippage clutch at a rate appreciably less than the rate of reengagement of said manually controlled clutch.

2. In a rail car, a source of power comprising an internal combustion engine, a clutch, and control means for the latter including a vacuum cylinder, a separate clutch disposed rearwardly of said first clutch and adapted to be driven therefrom, a piston and vacuum cylinder arranged to control said second clutch, means placing said second vacuum cylinder in operative communication with said first vacuum cylinder so that both of said clutches are operated at the same time, and means associated with said second clutch for delaying the engagement thereof so that the first clutch engages before the second clutch.

3. In a rail car, a driving truck, connections for driving the same including a gear housing carried by the car, a clutch casing carried at least in part by said gear housing, a slippage clutch disposed in said casing and arranged to drive said connections, a motor carried by said car and including a clutch, means including a gear transmission operatively connecting the latter clutch with said first named clutch, and means for simultaneously operating both of said clutches and providing for the reengagement of said motor clutch before the completion of the engagement of said slippage clutch.

4. In a rail car, a driving truck, connections for driving the same including a gear housing carried by the car, a clutch casing supported at one end on said gear housing, laterally spaced means supporting the other end of said casing, a clutch disposed in said casing and arranged to drive said connections, a motor carried by said car and including a clutch, means operatively connecting the latter clutch with said first named clutch, brake means disposed between said clutches and reacting against said casing, and means for simultaneously operating both of said clutches but at a different rate.

5. In a rail car, a motor having a clutch, transmission mechanism disposed rearwardly of the motor clutch and disengaged from the motor when said clutch is disengaged, a separate heavy duty clutch connected to be driven from the transmission and adapted for limited slippage during starting of the car, means for simultaneously disengaging both clutches, a power cylinder for each clutch for controlling the engagement thereof, and means associated therewith for causing the heavy duty clutch to engage at a slower rate than the motor clutch, thereby relieving the latter of the strain of starting the car.

6. In a rail car, a source of power comprising an internal combustion engine, a clutch, and control means for the latter including a vacuum cylinder, a separate clutch disposed rearwardly of said first clutch and adapted to be driven therefrom, a piston and vacuum cylinder arranged to control said second clutch, means placing said second vacuum cylinder in operative communication with said first vacuum cylinder, a controlling valve means disposed between said source and both of said cylinders and adapted to control the simultaneous flow of fluid between said cylinders and said source for simultaneously disengaging both of said clutches, and separate means associated with said second cylinder for insuring that the first clutch will be completely engaged before the engagement of said second clutch.

7. In a rail car, in combination, a power source, a change speed transmission, a driving truck, a first connecting unit disposed between said transmission and said power source, a second connecting unit disposed between said transmission and said truck, one of said connecting units including relatively movable parts arranged to transmit substantial amounts of torque through the selected ratio of said transmission with appreciable slippage in said unit so as to provide for the operation of said power source at a rate sufficient to develop said torque, and means for controlling said units whereby said one unit is engaged at a slower rate than the other unit.

8. In a rail car, a driving truck, connections for driving the same including a gear housing carried by the car, a clutch casing supported at one end on said gear housing, laterally spaced means supporting the other end of said casing, a clutch disposed in said casing and arranged to drive said connections, a motor carried by said car and including a clutch, means operatively connecting the latter clutch with said first named clutch, and means for simultaneously operating both of said clutches but at a different rate.

9. In a rail car, a driving truck, connections for driving the same, a gear housing carried by the car and enclosing a portion of said connections, a clutch casing supported in the car and directly connected with said gear housing so as to provide for their mutual support, a slippage clutch mechanism disposed in said clutch casing and arranged to transmit the drive to said connections, a source of power supported on the rail car and operatively connected through change speed mechanism with said slippage clutch, said latter being arranged to transmit power with appreciable slippage under relatively heavy torque loads, and separate means controlling the application of said power to said slippage clutch mechanism.

10. In a rail car, a power unit, a driving truck, a change speed transmission therebetween, a first clutch for positively coupling said transmission to said power unit upon initial clutch engagement, a second clutch between said transmission and said driving truck adapted to be partially engaged in the first stage of its operation simultaneously with the engagement of said first clutch for transmitting a gradually increasing amount of torque to the driving truck with appreciable slippage, and thereafter moving into positive clutching engagement and engaging and disengaging means for said clutches arranged to engage said second clutch at a slower rate than said first clutch.

11. In a rail car, a power unit, a driving truck, a change speed transmission therebetween, a first clutch for positively coupling said transmission to said power unit upon initial clutch engagement, a second clutch between said transmission and said driving truck adapted to be partially engaged in the first stage of its operation simultaneously with said first clutch for transmitting a gradually increasing amount of torque to the driving truck with appreciable slippage, and thereafter moving into positive clutching engagement, a piston connected to operate each clutch, a cylinder for each piston, a fluid pressure line connected with each cylinder, and means associated with the piston and cylinder for the second clutch for causing the latter to be engaged at its slower rate than said first clutch.

ROBERT J. BURROWS.
ALFRED O. WILLIAMS.